(12) United States Patent
Charbit et al.

(10) Patent No.: US 8,139,512 B2
(45) Date of Patent: Mar. 20, 2012

(54) DISTRIBUTED ITERATIVE DECODING FOR CO-OPERATIVE DIVERSITY

(75) Inventors: Gilles Charbit, Hampshire (GB); Jorma O. Lilleberg, Oulu (FI); Joseph R. Cavallaro, Pearland, TX (US); Marjan Karkooti, Bryan, TX (US)

(73) Assignee: Nokia Corporation, Espoo (FI)

( * ) Notice: Subject to any disclaimer, the term of this patent is extended or adjusted under 35 U.S.C. 154(b) by 391 days.

(21) Appl. No.: 12/156,211

(22) Filed: May 30, 2008

(65) Prior Publication Data

US 2008/0298474 A1    Dec. 4, 2008

Related U.S. Application Data

(60) Provisional application No. 60/932,799, filed on May 31, 2007.

(51) Int. Cl.
  *H04B 7/14*    (2006.01)
(52) U.S. Cl. .................. 370/279; 455/7; 455/15; 455/16
(58) Field of Classification Search .......... 370/276–279; 375/211–215; 455/7–25
See application file for complete search history.

(56) References Cited

U.S. PATENT DOCUMENTS

| | | | | |
|---|---|---|---|---|
| 6,977,888 | B1* | 12/2005 | Frenger et al. ................ | 370/218 |
| 2005/0265387 | A1* | 12/2005 | Khojastepour et al. ....... | 370/467 |
| 2007/0002766 | A1* | 1/2007 | Park et al. ...................... | 370/254 |
| 2007/0297498 | A1* | 12/2007 | Kramer ........................... | 375/211 |
| 2007/0300126 | A1* | 12/2007 | Nakao et al. ................... | 714/758 |

OTHER PUBLICATIONS

Khuong, Ho Van et al., "Performance Analysis of Cooperative Communications Protocol using Sum-Product Algorithm for Wireless Relay Networks", ISBN 89-5519-129-4, Feb. 20-22, 2006, ICACT2006.

Chakrabarti, Arnab et al., "Code Designs for Cooperative Communication", Signal Processing Magazine, IEEE, vol. 24, Issue 5, Sep. 2007, pp. 16-26.

Saad B Qaisar et al., "Optimal Progressive Error Recovery for Wireless Sensor Networks using Irregular LDPC Codes", Information Sciences and Systems, 2007, CISS 07, 41st Annual Conference on IEEE, PI, Mar. 1, 2007, pp. 232-237, XP031131858.

Daniela Tuninetti et al., "On the throughput improvement due to limited complexity processing at relay nodes", Information Theory, 2005, ISIT 2005 Proceedings, International Symposium on, Adelaide, Australia, Sep. 4-9, 2005, Piscataway, NJ, USA, IEEE Sep. 4, 2005, pp. 1081-1085, XP010845711.

(Continued)

*Primary Examiner* — Hassan Kizou
*Assistant Examiner* — Charles C Jiang
(74) *Attorney, Agent, or Firm* — Harrington & Smith

(57) ABSTRACT

A source sends an encoded data block during a first time interval to a destination and to a relay. The source sends additional parity bits for the encoded data block during a second time interval. The relay partially decodes that encoded data block to a process-defined end point (typically only a partial decoding), such as a fixed number of decoding iterations. After partial decoding the relay forms a modified data block having corrected information bits and the parity bits of the block it received, and sends the modified data block to the destination, during the second time interval. The destination decodes to a results-defined end point the modified data block it received from the relay using the additional parity bits it received from the source. If that end-point cannot be reached, the destination may begin anew decoding the original encoded data block it received from the source.

16 Claims, 6 Drawing Sheets

BROADCAST MODE (BC)

MULTIPLE ACCESS MODE(MAC)

OTHER PUBLICATIONS

Arnab Chakrabarti et al., "Low Density Parity Check Codes for the Relay Channel", IEEE Journal on Selected Areas in Communications, IEEE Service Center, Piscataway, US, vol. 25, No. 2, Feb. 1, 2007, pp. 280-291, XP011168567.

Gerhard Kramer, "Distributed and Layered Codes for Relaying", Signals, Systems and Computers, 2005, conference Record of the Thirty-Ninth Asilomar Conference on, Pacific Grove, California, Oct. 28-Nov. 1, IEEE, Piscataway, NJ, USA, IEEE, Oct. 28, 2005, pp. 1752-1756, XP010900320.

Predrag Radosavljevic et al., "Multi-Rate High-Throughput LDPC Decoder: Tradeoff Analysis Between Decoding Throughput and Area", Personal, Indoor and Mobile Radio Communications, 2006 IEEE $17^{th}$ InterNational Symposium on, IEEE, PI, Sep. 1, 2006, pp. 1-5, XP031023692.

Andrew Sendonaris et al., "User Cooperation Diversity-Part I: System Description", IEEE Transactions on Communications, IEEE Service Center, Piscataway, NJ, US, vol. 51, No. 11, Nov. 1, 2003, pp. 1927-1938, XP011103483.

* cited by examiner

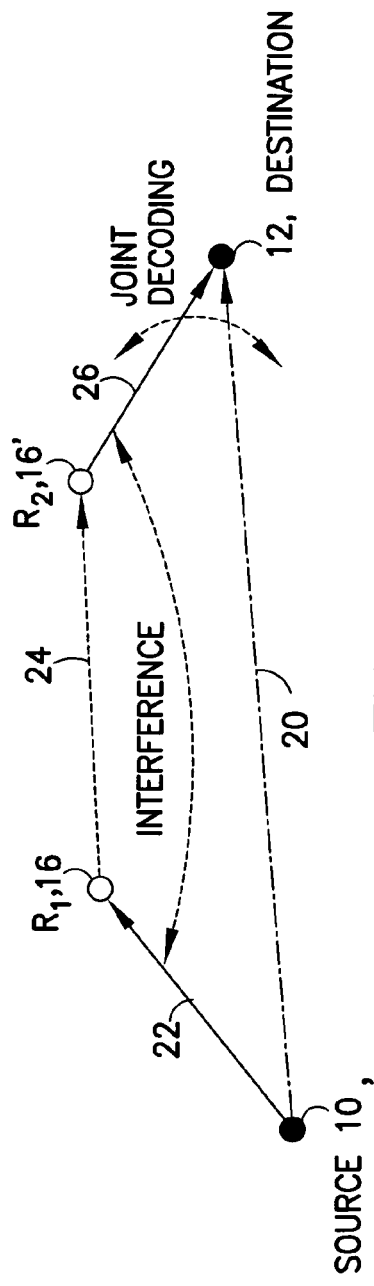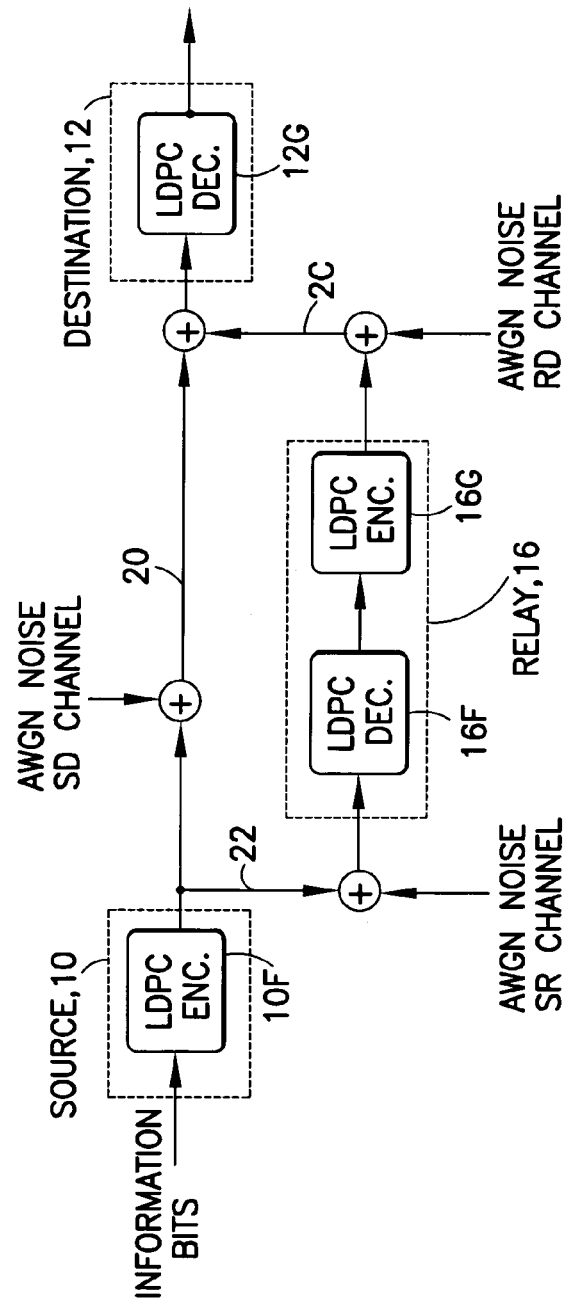

DISTRIBUTED ITERATIVE DECODING FOR CO-OPERATIVE DIVERSITY

CROSS REFERENCE TO RELATED APPLICATION

This patent application claims priority under 35 U.S.C. §119(e) from U.S. Provisional Patent Application No. 60/932,799, filed May 31, 2007, the disclosure of which is incorporated by reference herein in its entirety.

TECHNICAL FIELD

The exemplary and non-limiting embodiments of this invention relate generally to wireless communications systems and, more specifically, relate to the encoding and decoding of wireless communications in a network that employs relay nodes.

BACKGROUND

Various abbreviations that appear in the specification and/or in the drawing figures are defined as follows:
3GPP $3^{rd}$ generation partnership project
AP access point
BC broadcast mode
BS base station (e.g., Node B or e-Node B)
DF decode and forward
DL downlink
e- evolved (e.g., e-UTRAN or e-Node B)
IMT-A international mobile telephony-advanced
MAC multiple access mode
LDPC low density parity check codes
LTE long term evolution (3.9G)
MRS (M-RS) mobile RS
MS mobile station
OFDM orthogonal frequency division multiplex
RS relay station
Ss subscriber station
UE user equipment
UL uplink
UMTS universal mobile telecommunication system
UTRAN UMTS terrestrial radio access network
WiMAX world interoperability for microwave access (IEEE 802.16)
WLAN wireless local area network A wireless relay network is a multi-hop system in which end nodes (UE/MS/SSs, referred to for convenience hereafter as UEs) are connected to the BS (e.g., base transceiver station, Node B or e-Node B) or AP (e.g. WLAN or WiMAX access point) via a RS. UL or DL traffic between UEs and the BS/AP may pass through and be processed by the RS. An example of one particular relay network concept is described in IEEE 802.16 Multi-hop Relay (MR), which is a recently established task group that is referred to as 802.16j. The MR effort is focused on defining a network system that uses RSs to extend the network coverage and/or enhance the system throughput.

A mobile multi-hop relay station, referred to herein as a RS, is useful for extending coverage and/or throughput of a BS. One non-limiting environment relative to these teachings is described in the context of IEEE 802.16 technology, also known as WiMAX. RSs are useful for extending coverage at a cell edge, to otherwise weak signal areas of a cell such as where shielded by a building, and for enabling stable communications on a moving platform such as a train. In that regard, the RS need not be fixed but may be mobile. The RS may be a dedicated RS as in the train example, or may be non-dedicated as in the case of another UE that is used to relay communications between a source mobile station and a destination such as the AP/BS. It is seen then that the RS may be embodied in a variety of hardware, fixed or mobile, dedicated to relay or not. To avoid inadvertent interference due to the addition of the RSs in the network, each node capable of acting as a RS is associated with a coverage area within which it will operate as a RS. Clearly, for a mobile RS that coverage area moves with the position of the RS itself.

While physical extension of the cell coverage area is the most visible function of RSs, they are also used to increase data throughput in the wireless network. Use of relays and co-operative diversity has been considered for the next generation of cellular systems by business and university researchers.

The main idea in using relays for increased throughput is that the source transmits data directly to destination in a conventional way and also transmits indirectly via a number of relays to the destination. While either of the UE and Node B can be a source or destination in any given communication depending upon whether it is UL or DL, the convention used herein by non-limiting example is that, where specified, the UE is acting as the source and the Node B is acting as the destination. At the Node B destination, joint decoding is typically required to combine received data signals from direct link (between the source and destination), and the indirect link (passing from the source to one or more relays then to the destination). The joint decoding at the destination is essential to achieve full co-operative diversity gain, but must be done with practical complexity.

Low Density Parity Codes (LDPC) have been considered in the context of co-operative diversity [see for example: A. Chakrabarti, A. de Baynast, A. Sabharwal, B. Aazhang, "LDPC CODE-DESIGN FOR THE RELAY CHANNEL", *IEEE Journal on Selected Areas in Communications*, Vol. 25, No. 2, February 2007]. LDPC code performance may depend on the number of iterations and code length, which comes at the cost of higher complexity [see specifically P. Radosavljevic, A de Baynast, M. Karkooti, and J. R. Cavallaro, "MULTI-RATE HIGH-THROUGHPUT LDPC DECODER: TRADEOFF ANALYSIS BETWEEN DECODING THROUGHPUT AND AREA," $17^{th}$ *IEEE International Symposium on Personal, Indoor and Mobile Radio Communications (PIMRC)*, September 2006]. At the destination, iterative joint decoding of signals received via the direct link and the indirect link may have relatively high complexity and hence increase the implementation cost of joint decoding significantly. A distributed coding scheme has been recently introduced that aims at using LDPC code components for the source-relay link and for the relay-destination link that perform equally well to maximize performance. [see A. Chakrabarti, B. Aazhang, "INFORMATION THEORETIC LIMITS AND CODE DESIGNS FOR COOPERATIVE COMMUNICATIONS" accepted for publication in *IEEE Signal Processing Magazine*, February 2007]. This requires joint coding design for LDPC code components, which the inventors see as potentially limiting the number of potential code designs and applications. Using large LDPC code lengths increases the complexity of iterative LDPC decoding in the relays and destination. This may prove problematic if large code lengths are used for best performance.

For example, full decoding in both the relay and the destination using a simple Hamming code was presented in a paper by A. Sendonaris, B. Aazhang, entitled: "USER COOPERATION DIVERSITY—PART I: SYSTEM DESCRIPTION" (*IEEE Trans. Com, Vol.* 51, No. 11, November 2003). The relay decodes the Hamming codeword iteratively and transmits the estimated corrected codeword with reliability for each symbol—i.e. soft symbols. At the destination, the received soft codeword is again iteratively decoded. This is a form of distributed iterative decoding. This is seen to be a very computationally expensive solution with practical limits to implementation.

What is needed is a way to exploit the advantages of joint decoding in a relay-based network without adding so much complexity that the joint decoding cannot keep up with real-time high data rates, which would render the overall system less practical. Embodiments of the invention detailed below presents such a solution, though as will be seen it is not limited to only real-time decoding and/or very high data rates.

SUMMARY

In accordance with an exemplary embodiment of the invention is a method that includes receiving from a source during a first time interval an encoded data block, decoding the received encoded data block to a process-defined end point and from the decoding forming a modified version of the encoded data block, and then transmitting to a destination, during a second time interval subsequent to the first time interval, the modified version of the encoded data block.

In accordance with another exemplary embodiment of the invention is a device that includes a receiver, a decoder, a processor and a transmitter. The receiver is configured to receive from a source during a first time interval an encoded data block. The decoder is configured to decode the received encoded data block to a process-defined end point. The processor is configured to form from the decoded received encoded data block a modified version of the encoded data block. And the transmitter is configured to transmit to a destination, during a second time interval subsequent to the first time interval, the modified version of the encoded data block.

In accordance with still another exemplary embodiment of the invention is a computer readable memory embodying a computer program that is executable by a processor to perform actions directed to distributed decoding. In this embodiment the actions include decoding to a process-defined end point an encoded data block that is received from a source during a first time interval, and from the decoding, forming a modified version of the encoded data block. The actions follow with transmitting to a destination, during a second time interval subsequent to the first time interval, the modified version of the encoded data block.

In accordance with a further exemplary embodiment of the invention is a method that includes receiving from a source during a first time interval an encoded data block, and receiving from the source during a second time interval additional error correction data, and receiving from a relay a modified version of the encoded data block. Further in the method, the modified version of the encoded data block that is received from the relay is decoded using the additional error correction data that is received from the source.

In accordance with yet another exemplary embodiment of the invention is a device that includes at least one receiver and a decoder. The at least one receiver is configured to receive from a source during a first time interval an encoded data block, and to receive from the source during a second time interval additional error correction data, and to receive from a relay a modified version of the encoded data block. The decoder is configured to decode the modified version of the encoded data block (that is received from the relay) using the additional error correction data (that is received from the source).

In accordance with a further exemplary embodiment of the invention is a computer readable memory embodying a computer program that is executable by a processor to perform actions directed to distributed decoding. In this embodiment the action of decoding is responsive to a) receiving from a source during a first time interval an encoded data block, and b) receiving from the source during a second time interval additional error correction data, and c) receiving from a relay a modified version of the encoded data block. Responsive to those, the action of decoding includes decoding the modified version of the encoded data block received from the relay using the additional error correction data received from the source.

In accordance with a further exemplary embodiment of the invention is a device that includes a processor and a transmitter. The processor is configured to encode information bits into an encoded block of data that includes the information bits and a first set of parity bits. The processor is further configured to compute a second set of parity bits from the information bits. The transmitter is configured to send the encoded block of data to a destination and to a relay, and is also configured to send the second set of parity bits, without the information bits, at least to the destination.

These and other aspects are detailed with more particularity below.

BRIEF DESCRIPTION OF THE DRAWINGS

Embodiments of the invention are detailed below with particular reference to the attached drawing Figures.

FIG. 2 is a conceptual view of an environment in which embodiments of the invention may be used, showing communications among a source, destination, and two relays.

FIG. 3 is a schematic block diagram showing further detail of certain apparatus shown in FIG. 1 using a half-duplex relay channel.

DETAILED DESCRIPTION

Figure 1:
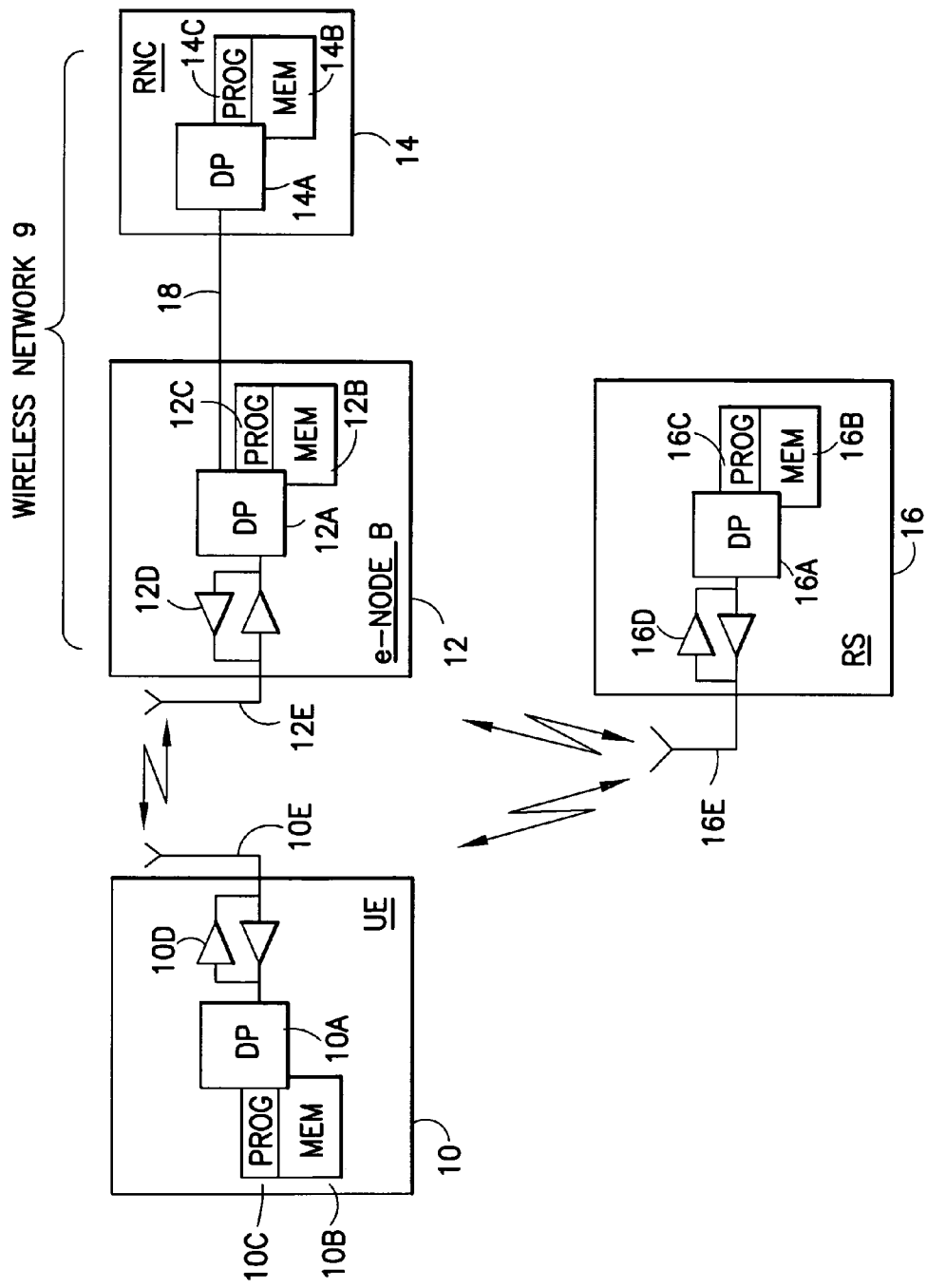
FIG. 1 shows high-level schematic block diagrams of apparatus in which embodiments of the invention may be implemented.

Recall the brief discussion above of the paper by A. Sendonaris, B. Aazhang, entitled: "USER COOPERATION DIVERSITY—PART I: SYSTEM DESCRIPTION". Because the iterative decoding is allowed to carry on until it converges to a solution in the approach of that paper, it is seen to result in maximum complexity in the relay. The end result is seen to yield only some modest reduction in complexity at the destination, depending on how successful the decoding was in the relay. Embodiments of this invention take a different approach, reducing the iterative decoding processing load of the indirect link that passes through the relay. This is seen to render more practical both the decoding in the relay, and the joint decoding in the destination.

As an overview, embodiments of this invention distribute the iterative decoding of an encoded data block from the source among both the destination and one or more relays. In a particular embodiment the encoded data block is encoded with an LDPC code. Consider for this example two time intervals in a slot. In a first time interval of the slot, the source transmits an LDPC encoded data block to both the relay and the destination. Note that both of these LDPC data blocks are encoded with the same underlying LDPC code; the data blocks as transmitted are identical. At the relay, the received data block is partially decoded, say a few decoding iterations that stop short of converging to a full/optimal solution. This is quite unlike the concept detailed in the paper "USER COOPERATION DIVERSITY—PART I: SYSTEM DESCRIPTION" noted above, which fully decodes at the relay. Next, the relay sends to the destination, in the second time interval of the slot, what is termed herein as the modified broadcast data, which is the original LDPC encoded data block with the partial decoding completed. During that same second time interval of the slot, the source transmits to the destination additional parity for the same data block, which we term herein the multiple access mode or MAC. The destination now has three pieces of information with which to decode: the original encoded data block sent from the source during the first time interval (which the destination can iteratively decode to whatever extent is practical in a given situation, including iterating to full convergence), the partially decoded message sent from the relay during the second time interval of the slot which is the modified broadcast data, and the additional parity sent from the source also during the second time interval of the slot. The destination can then do joint decoding using these three pieces of information to converge the original encoded data block to an optimal solution. Because the modified broadcast data already exhibits the first few iterations of the decoding, there is no need for the destination to again decode to those first few iterations. In this manner the decoding is distributed and cooperative among the relay and the destination, and unlike the referenced paper no single node need to converge the original encoded data block to the optimal solution on its own.

Of course, should there be a problem with decoding at the destination, the destination still retains the original encoded block with which to attempt full decoding if it finds that beginning from the partial decoding done by the relay has not converged yet.

Reference is now made to FIG. 1 for illustrating a simplified block diagram of various electronic devices that are suitable for use in practicing the exemplary embodiments of this invention. In FIG. 1 a wireless network 9 is adapted for communication with a UE 10 via a Node B (base station) 12. The network 1 may include a serving radio network controller RNC or other radio controller function known by various terms in different wireless communication systems. The UE 10 includes a data processor (DP) 10A, a memory (MEM) 10B that stores a program (PROG) 10C, and a suitable radio frequency (RF) transceiver 10D (which includes both transmitter and receiver) coupled to one or more antennas 10E (one shown) for bidirectional wireless communications with the Node B 12, which also includes a DP 12A, a MEM 12B that stores a PROG 12C, and a suitable RF transceiver 12D coupled to one or more antennas 12E. The Node B 12 may be coupled via a data path 18 (e.g., Iub) to the serving or other RNC.

Also within the network 9 is a relay station RS 16 that includes a DP 16A, a MEM 16B that stores a PROG 16C, and a suitable RF transceiver 16D coupled to one or more antennas 16E. The RS 16 is in wireless communication with the UE 10, and wireless or wired communication with at least the Node B 12. As noted above, the RS 16 itself may be fixed or mobile. At least one of the PROGs 10C, 12C and 16C is assumed to include program instructions that, when executed by the associated DP, enable the electronic device to operate in accordance with the exemplary embodiments of this invention, as will be discussed below in greater detail. Inherent in the DPs 10A, 12A, 14A and 16A is a clock to enable synchronism among the various apparatus for transmissions and receptions within the time intervals and slots detailed below.

Related more specifically to the exemplary embodiments of this invention, and as shown in FIG. 3, each of the UE 10, Node B 12 and RS 16 include an LDPC encoder 10F, 16F and an LDPC decoder 12G, 16G that is assumed to be responsible respectively for encoding and decoding in accordance with the exemplary embodiments of this invention. FIG. 3 is in the context of UE 10 as source and Node B 12 as destination and so only the LDPC encoder 10F is shown for the UE 10 and the LDPC decoder 16G is shown for the Node B 12. As noted above, either the UE 10 and the Node B 12 act as source and destination at various times of a two-way communication and so each includes both a LDPC encoder and LDPC decoder. The modules 10F, 12G, 16F and 16G may be embodied in software, firmware and/or hardware, as is appropriate. In general, the exemplary embodiments of this invention may be implemented by computer software stored in the MEM 10B and executable by the DP 10A of the UE 10 and similar for the other MEMs and DPs, or by hardware, or by a combination of software and/or firmware and hardware in any or all of the devices shown.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

In general, the various embodiments of the RS 16 may include any of the UE embodiments noted above, a fixed RS mounted to a movable platform (e.g., a train), and additionally may be a geographically fixed RS (e.g., mounted to a building) such as a BS in a logical layer of the network under control of the Node B.

The MEMs 10B and 12B may be of any type suitable to the local technical environment and may be implemented using any suitable data storage technology, such as semiconductor-based memory devices, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

An important aspect of embodiments of this invention is that iterative decoding in the relay is stopped when a maximum number of iterations is reached no matter whether the iterative decoding has converged to the final result or not. Likewise, in the destination partial decoding applies, or may be allowed to run its full course until the iterative decoding converges to a solution. Embodiments of this invention therefore best trade-off between complexity and performance, but in this approach complexity is not sacrificed wholly, but distributed among the relay and the destination. Due to early success with the general concept, more advanced LDPC codes were considered in further developing this invention. Note that in some specific instances the limited decoding done at the relay may result in a converged solution, despite the end point of the relay decoding being a process-oriented metric (e.g., a pre-determined number of decoding iterations selected so as to only partially decode in the typical case) rather than a results-oriented termination point (convergence). To account for this situation, the destination may first check whether the relay has done partial or complete decoding, and in the case of partial decoding the destination shall continue iterative decoding to the final result. One way of viewing the distinction in this context is that the relay decodes to a process-defined end point and the destination decodes to a results-defined end point.

Consider FIG. 2. While the description below is in the context of one relay between source and destination, embodiments of the invention are not limited to only one relay but also apply to two or more relays, as shown there. Continuing with the UE 10 as source convention noted above, shown is the UE 10 as source transmitting via a direct link 20 to the Node B 12 as destination, and also transmitting indirectly to that same destination 12 through a first relay 16 and seriatim through a second relay 16' via respective indirect links 22, 24 and 26. The dashed line link 24 indicates this link may be collapsed so that only one relay 16 is along the indirect path, or expanded to more than the two illustrated relays. In embodiments with more than one relay, the partial decoding may be distributed among more than one of the relays involved, or only one relay need to partially decode and the others simply pass the received message without further LDPC decode processing. For brevity, the direct link is referenced below by reference number 20 and the indirect link is referenced below by reference numbers 22/26, without loss of breadth flowing from the dotted line 24 at FIG. 2. Note that where there are two relays in sequence, with respect to the first relay 16 it is the second relay 16' that is in the position of the 'destination' even though that second relay 16' is not the final destination 12, and also with respect to the second relay 16' it is the first relay 16 that is in the position of the 'source' even though the first relay 16 is not the original source 10 which created the encoded data block.

As summarized above, embodiments of this invention distribute the iterative decoding for LDPC encoded source data between a half-duplex relay 16 and the destination 12. Maximum ratio combining of the direct link 20 (source-destination) and indirect link 22/26 (source-relay-destination) is applied at the destination 16. This is illustrated in FIG. 3, using the same nomenclature as FIG. 2. FIG. 3 shows channel 22 as source to relay SR, channel 20 indicating source to destination SD, and channel 26 indicating relay to destination RD. These represent logical channels and not constrained by a frequency and/or time bound.

Figure 4:
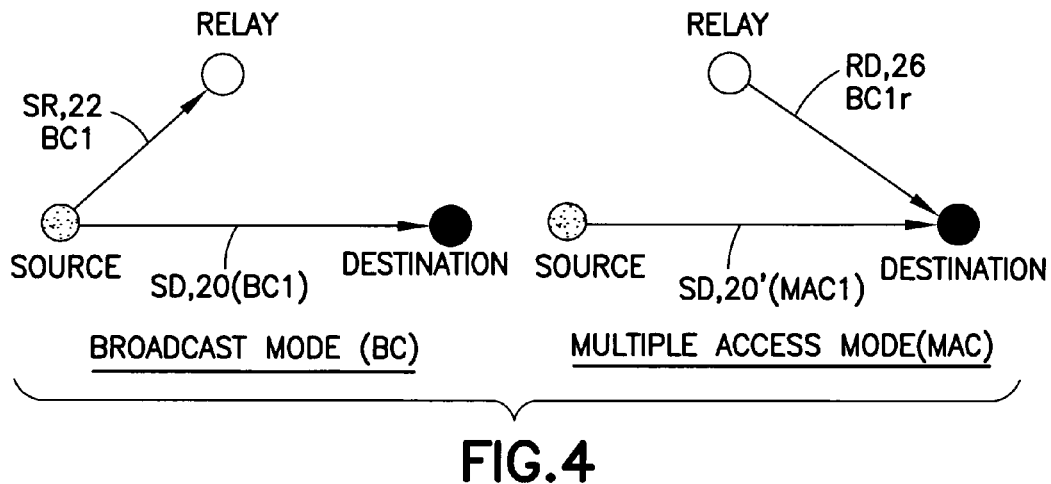
FIG. 4 is a conceptual diagram similar to FIG. 2 but showing communications divided between two different time intervals of a slot according to exemplary embodiments detailed herein.

As half-duplex relaying is used in this example, the source 10 and relay 16 transmit in two consecutive normalized time intervals, a first time interval t and a second time interval t'=1−t. A time slot consists of respective first and second time intervals t and t'. The phase during the first time interval t is termed herein broadcast mode (BC); the phase during the second time interval t' is termed herein the multiple access mode (MAC), as shown on FIG. 4.

During the first time interval t, the source 10 transmits on the SR channel 22 an encoded data block, designated BC1, to the relay 16 and also on the SD channel 20 to the destination 12 using the same LDPC code. Note that the term data block refers to an encoded block but is not limited to a single block encoded as such; an 'encoded data block' may readily refer to multiple data blocks, separately encoded with the same LDPC code and transmitted as a group within the first time interval t of the slot.

In the second time interval t', the relay 16 transmits on the RD channel 26 a modified copy of the broadcast data, designated herein as BC1r, to the destination 12. In embodiments of this invention, the modified broadcast data BC1r is the corrected broadcast data BC1 after a few LDPC decoding iterations without further encoding. It is noted that this also is a distinction over traditional decode and forward (DF) schemes seen elsewhere in the literature, where the relay traditionally detects and decodes the received signal and subsequently re-encodes and transmits the new encoded signal [see for example the previously referenced paper entitled: "USER COOPERATION DIVERSITY—PART I: SYSTEM DESCRIPTION"].

Because only a few iterations (which for typical LDPC codes results in partial but incomplete decoding) have been carried out in the relay, the relay's LDPC decoding operation cannot be assumed to have converged to an optimum solution. As was noted above however, the relay's process-defined end-point may in fact result in full decoding from time to time. In the relay this may be embodied as a computer instruction to perform x iterations, where x is limited to a relatively low integer number, less than 20 and preferably less than half the total number of iterations one would estimate that under normal circumstances would be required to converge to a full solution (see FIG. 5). This arbitrary limit on the LDPC decoder 16F in the relay 16 is too low to converge to an optimal solution since it is an arbitrary limit and not process based that considers convergence of the actual decoding. Transmitting BC1r with partially decoded and corrected BC1 data, without further encoding at the LDPC encoder 16G of the relay 16, allows LDPC iterative decoding to continue in the destination 16. Hence, the LDPC decoding can be considered to be distributed across the relay 16 and destination 12, and iterative LDPC decoding processing load is shared out between the relay 16 and the destination 12.

At the same time, the source 10 transmits on the SD channel 20' additional parity MAC1, to the destination 12. This SD channel is designated 20' to show that it is during the second time interval t' of the slot, different from when the BC1 data was sent in the first time interval t over the original SD channel 20.

Figure 5:
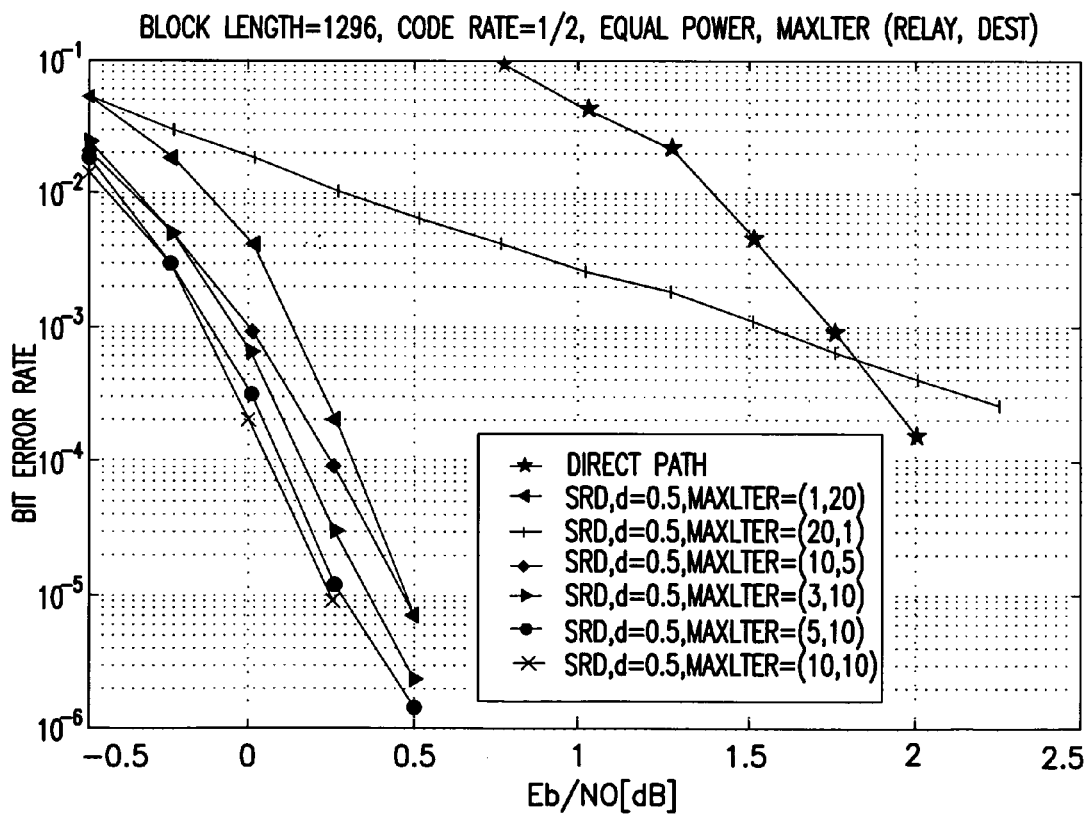
FIG. 5 is a graph of bit error rate versus signal to noise ratio SNR and showing the effect of number of iterations at the relay and the destination on the performance, using distributed and partial decode and forward at the relay using a length 1296, rate ½ LDPC code.

The performance was simulated in isolated cell with an additive white Gaussian noise AWGN scenario, the results of which are presented in the graph of FIG. 5. Various code rates, relay positions, and power allocation for source and relay were tried in the simulations, shown more particularly in an exhibit attached to the priority document and entitled "COOPERATIVE COMMUNICATION USING SCALABLE, MEDIUM BLOCK-LENGTH LDPC CODES". The best simulated performance for a conventional decode and forward (DF) scheme was achieved with the relay positioned half-way between the source and the destination, with equal power for source and relay, and LDPC with code rate ½ and code length 1296. For comparison, performance for distributed iterative decoding according to these teachings was also simulated with the relay at the geographic mid-point between the source and the destination with the same assumptions. The optimum position for the relay was shown to be at a normalized distance of d=0.4 from the source (where the distance from source to destination is d=1.0). FIG. 5 shows that if there is limited processing time/power in the system, it is better to distribute the processing load between the relay and the destination. Different bit error curves for the decode and forward with partial and distributed decoding are shown. Number of decoding iterations performed at the relay and at the destination is depicted in the parenthesis in the legend of FIG. 5. Comparing the case of (1,20) and (20,1) and also (15,5), (5,15) show that if there is a limited number of iterations or equivalently a limited latency to tolerate, it is better to perform a few iterations at the relay and more iterations at the destination. Note that even if after partial decoding, there still exist some error in the relay codeword, there is a major gain in the performance compared to the direct path transmission. Comparing the cases for (3,10), (5,10), (10,10) shows that the first few iterations at the relay are very important, but the effect of the relay saturates as the number of iterations grows. This supports the proposed argument of partial and distributed decoding at the relay and destination. It was found that optimum splitting of the number of iterations between the relay and the destination provided the best simulated performance as shown in FIG. 5 [last entry in the legend where MaxIter=(10,10)]. This is expected in AWGN conditions.

More extensive simulations to account for fading, path loss, multiple users, and so on may find a different split as between the decoding iterations. An even split was seen to give the best performance for the system model used for the examples presented above. That system model assumes half-duplex relays with timesharing, two consecutive timeslots, source transmit power in the SD link is equal to the relay transmit power on the RD link, relay lies in a line between source and destination, additive white Gaussian noise and BPSK signalling with slow fading While the simulations were done using LDPC codes, these teachings are not so limited; other codes such as for example turbo codes may be iteratively decoded and such are subject to the distributed decoding described herein. These teachings may be applied to any iterative decoding method.

Figure 6:
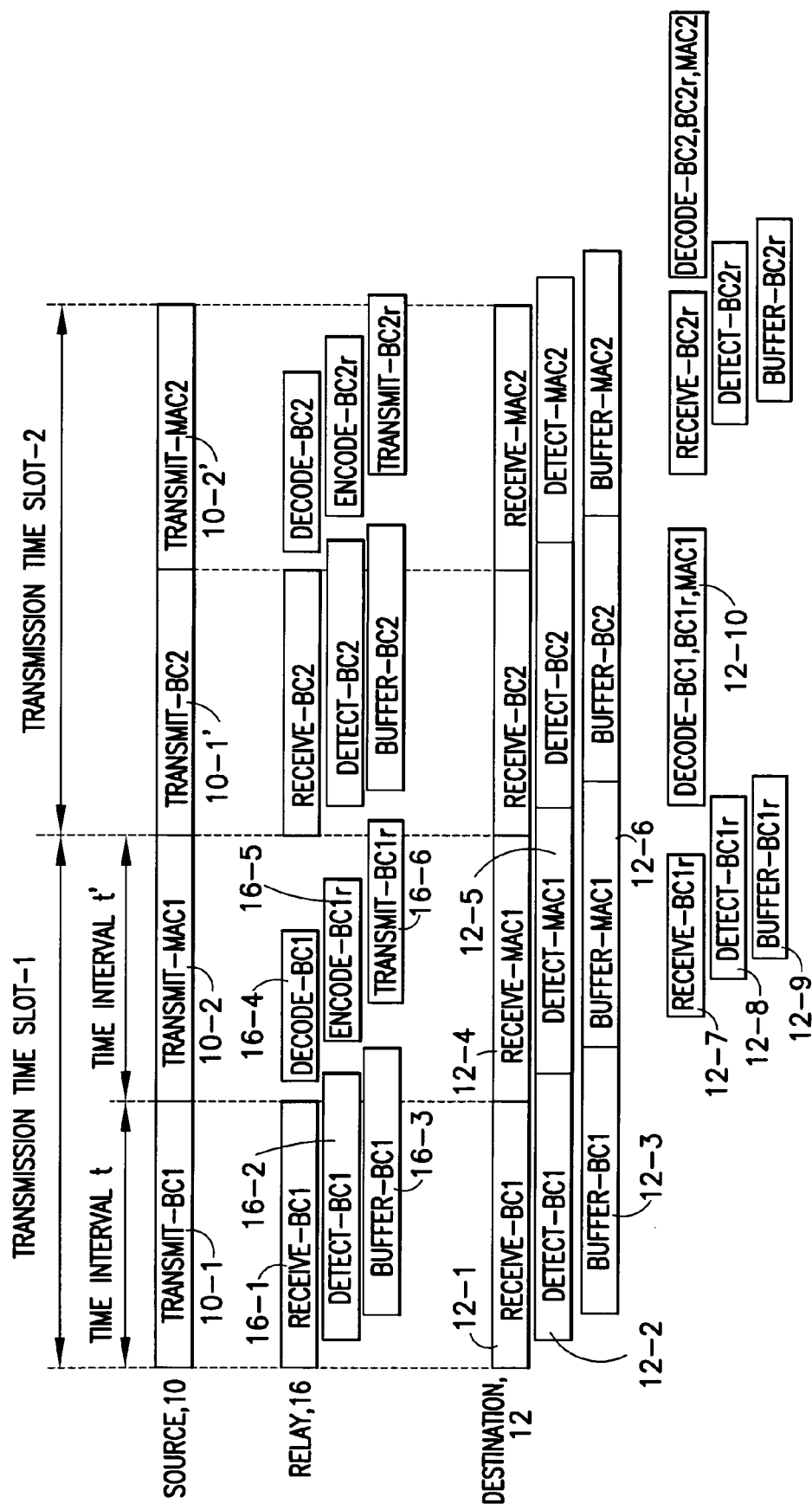
FIG. 6 is a timing diagram showing various communications among source, relay and destination disposed in the various time intervals of two consecutive time slots, according to exemplary embodiments of the invention.

FIG. 6 is a timing diagram illustrating further detail as to how timing is used to allow for a half-duplex relay. The source data transmission time slot is divided in two halves as illustrated in FIG. 6, a first time interval t and a second time interval t' shown explicitly for "transmission time slot-1" and by implication also apply to "transmission time slot-2".

During the broadcast phase (the first time interval t), the source 10 transmits 10-1 encoded data BC1. The relay 16 receives 16-1 data BC1 from the source 12, detects it 16-2 and buffers it 16-3. The destination 12 also receives 12-1 BC1, detects it 12-2, and buffers it 12-3. As the relay 12 doesn't transmit during that first time interval t, the destination 12 only receives 12-1 the encoded signal BC1 from the source 12.

During the multiple access phase (the second time interval t'), the relay 16 decodes 164 with a few iterations the data BC1 received previously 16-1 in the broadcast phase. This may already be sufficient to correct a few errors. The relay 16 then may optionally encode 16-5 the estimated information bits with the same LDPC code, and subsequently transmits 16-6 the modified codeword, BC1r, to the destination 12. In some embodiments of this invention, the relay 16 doesn't do any encoding 16-5, but encoding by the relay is shown in the timing diagram as it remains an option without departing from the broader teachings herein. The destination 12 also receives 12-4 additional parity MAC1 during that second time interval, which was sent 10-2 by the source 12 directly.

Processing time may impact timing as shown in FIG. 6. The relay 16 must wait for the BC1 data to be in its buffer 16-3 before it can decode 16-4, encode 16-5, and transmit 16-6 it. One way to avoid processing delay is to change the schedule. Two consecutive broadcast transmissions BC1 and BC2 followed by a multiple-access transmission could be sent, instead of a single broadcast followed by a multiple-access broadcast. This would initialize the processing. After the initialization, broadcast and multiple-access transmissions alternate as shown in FIG. 6. This would allow the relay 16 sufficient time to process 16-4, 16-5 the broadcast data BC1 while receiving broadcast data BC2. The relay 16 subsequently transmits 16-6 the modified broadcast data BC1r and processes the broadcast data BC2 during the multiple access phase in the next time slot with no processing delay. Further, the relay 16 transmits the modified broadcast data BC2r and processes the broadcast data BC3 during the multiple access phase in the next time slot, and so on. This solution increases the buffering about twofold at the relay 16 and destination 12.

In embodiments of this invention, the relay 16 may simply detect 16-2 and decode 16-4 broadcast data with a few iterations to reduce complexity. The relay 16 then transmits 16-6 the modified broadcast data—i.e. detected and corrected—without additional LDPC encoding 16-5. It should be noted that after partial decoding at the relay, the parity bits in the codeword are not discarded (as opposed to the full decoding) and the relay still transmits a codeword to the destination, but the encoding is not performed at the relay. A simple implementation of the solution would correct errors in the codeword and re-transmit it without encoding 16-5. After iterative decoding has been completed in the relay 16 (the few iterations, not to a convergent solution), the information bits and parity bits in error can be readily corrected in the destination 12. The advantages of this scheme is reduced processing time, reduced hardware complexity and power consumption at the relay.

As shown with FIG. 2, embodiments of this invention can be extended to multiple relays 16, 16' on the indirect links 22/24/26 to further distribute iterative decoding among more than one relay.

Synchronisation between the source 10, relays 16, 16', and destination 12 needs to be accurate enough, and specific implementation of that synchronism can follow general concepts known in the art or may be particularly developed for this invention. The impact on delays should be studied carefully in developing such synchronism, depending on whether real time services, or non-time critical services are assumed.

At the destination 12, final iterative decoding of the signals sent on the indirect link 22/26 can be done with fewer iterations, as errors have been corrected partly along the way by the relay 16. The signals sent by the source 10 on the direct link 20/20' can also be iteratively decoded and combined with the decoded signals from the indirect link 22/26.

The complexity of the iterative LDPC decoding in the relay 16 is significantly reduced compare to having full iterative decoding followed by encoding prior to transmission to destination, as was the approach of the above described paper.

The modified broadcast data BC1r consists of corrected information bits and received parity bits. This is sub-optimum as there may be a few parity bits in error, and these errors will be transmitted to the destination 12. To address this issue, optionally the BC1r may be encoded 16-5 with same LDPC code (i.e. same code rate and code length) after decoding 16-4. In another option, the BC1r may be encoded 16-5 with a different LDPC code to better reflect the transmission conditions between relay 16 and destination 12 along the RD channel 26.

In these options, iterative decoding may not be distributed across relay 16 and destination 12; instead the relay 16 and the destination 12 carry out LDPC decoding iterations to converge to the optimum solution independently. This implies higher complexity in both the relay 16 and the destination 12 than in the other embodiments of the invention where either no encoding is done at the relay 16 or only encoding with the same LDPC code is done there. Performance was simulated with the BC1r encoded with same LDPC code and the relay 16 positioned half-way between the source 10 and the destination 12, and equal power for source 10 and relay 16 transmission for comparison with the conventional DF scheme. The performance gain compared to the other embodiments of this invention was less than one dB at BER=$10^{-3}$ or $10^{-4}$. This may be an acceptable trade-off in some applications between complexity and performance in the relay 16 and destination 12.

Figure 7A:
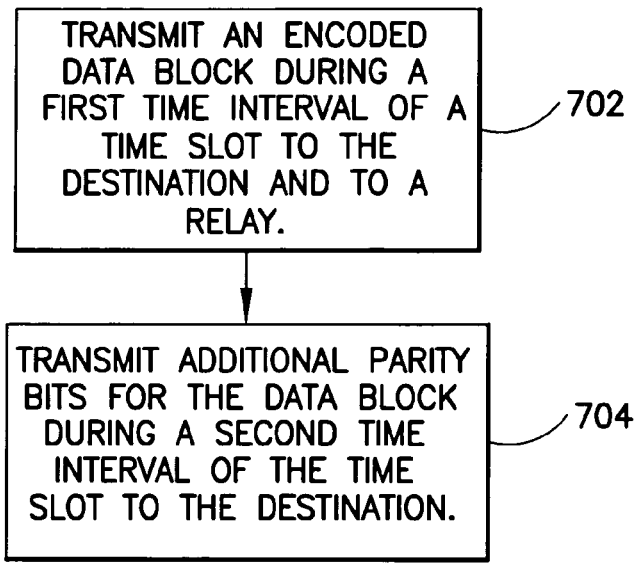
FIG. 7A is a diagram of method steps executed by the source according to one exemplary embodiment of the invention.

FIG. 7A is a series of process steps executed by the source according to one exemplary embodiment of the invention. At block 702 the source transmits an encoded data block, during a first time interval of a time slot, to both the relay and to the destination. At block 704, the source transmits additional parity bits for the data block, during a second time interval of the time slot, to the destination.

Figure 7B:
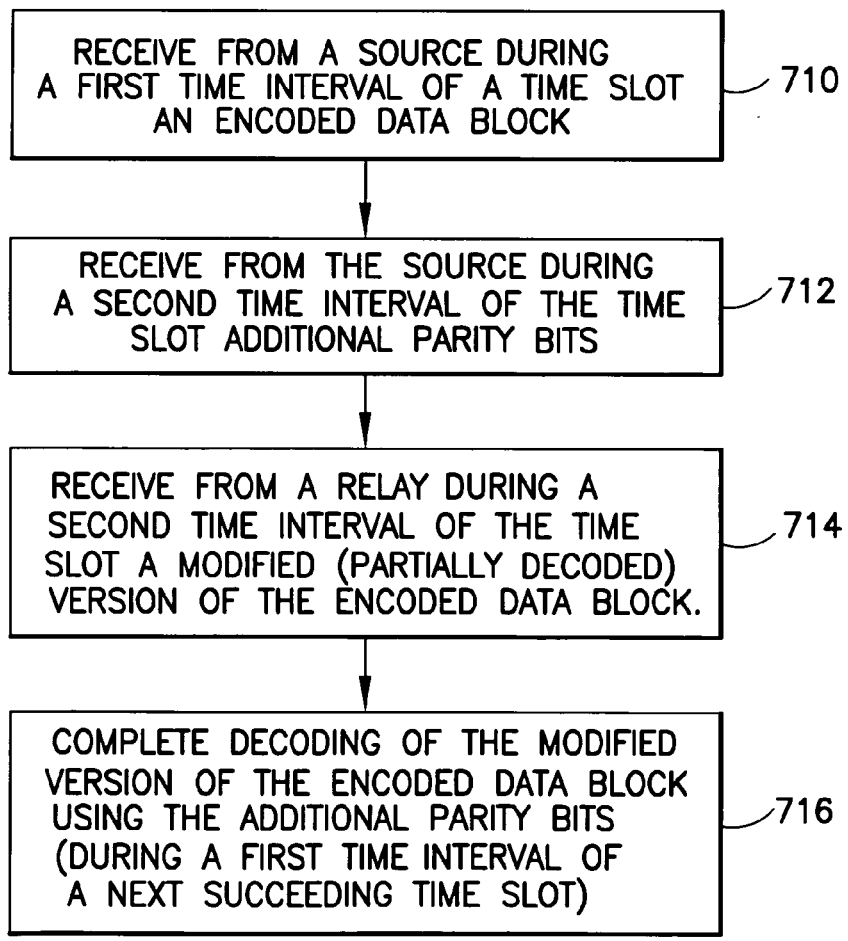
FIG. 7B is a diagram of method steps executed by the destination according to one exemplary embodiment of the invention.

FIG. 7B is a series of process steps executed by the destination according to one exemplary embodiment of the invention. At block 710, the destination receives from the source, during a first time interval of a time slot, the encoded data block. At this point though not shown in FIG. 7B, the destination may begin a traditional full decoding of that received encoded block. At block 712, the destination receives from the source during a second time interval of the time slot additional parity bits. Note that while additional parity bits are used by example, the concept may be generalized without loss of advantage to additional error-coding bits—they need not be parity bits but would be for the exemplary LDPC codes. At block 714, the destination receives from a relay during the second time interval of the time slot a modified version of the encoded data block, which is either the partially decoded block directly or the partially decoded and again re-encoded data block, depending on the option used. At block 716, the destination can then complete the decoding of the data by beginning with the modified version of the encoded data block received from the relay at block 714, and using the additional parity bits received from the source at block 712. This decoding at block 716 need only begin with the iteration where the relay left off. If full decoding of the encoded data block received at block 710 from the source is also done, then this decoding also can be used to reduce error rate.

Figure 7C:
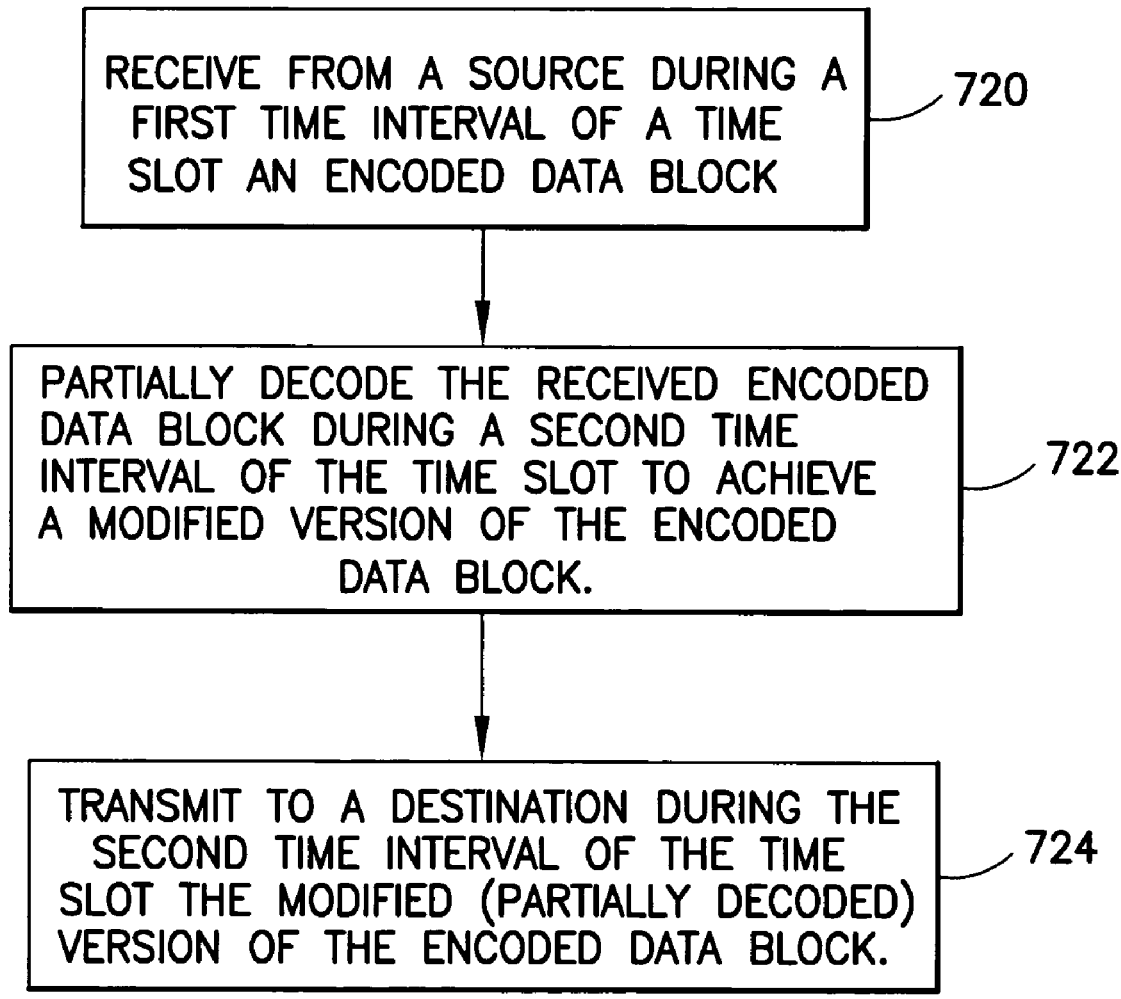
FIG. 7C is a diagram of method steps executed by the relay according to one exemplary embodiment of the invention.

FIG. 7C is a series of process steps executed by the relay according to one exemplary embodiment of the invention. At block 720 the relay receives from the source during a first time interval of the time slot an encoded data block. At block 722 the relay partially decodes the received encoded block during a second time interval of the time slot. The result of this we term the modified version of the encoded data block, and the number of iterations executed by the relay is some relatively low integer number, in the range of 3-10 for most practical applications using conventional LDPC codes. At block 724 the relay transmits to the destination during the second time interval of the time slot the modified version of the data block.

As can be seen then from FIGS. 7A-7C, each of the source, relay and destination embody novel aspects of the invention in and of themselves.

In accordance with the described exemplary embodiments of the invention, there is provided with respect to the source a computer program embodied on a computer readable memory and executable by a processor, a method and an apparatus configured to transmit an encoded data block during a first time interval of a time slot to both a relay and to a destination, and thereafter during a second time interval of the time slot to transmit additional error coding bits for the data block to the destination.

In accordance with the described exemplary embodiments of the invention, there is provided with respect to the destination a computer program embodied on a computer readable memory and executable by a processor, a method and an apparatus configured to receive from a source during a first time interval of a time slot an encoded data block, to receive from the source during a second time interval of the time slot additional error coding/correction bits, to receive from a relay during the second time interval of the time slot a modified version of the encoded data block, and thereafter to decode the modified version of the encoded data block received from the relay using the additional error coding/correction bits received from the source.

In accordance with the described exemplary embodiments of the invention, there is provided with respect to the relay a computer program embodied on a computer readable memory and executable by a processor, a method and an apparatus configured to receive from a source during a first time interval of a time slot an encoded data block, to partially decode the received encoded block during a second time interval of the time slot, and to transmit to a destination during the second time interval of the time slot the modified version of the data block. That transmission may be with or without further encoding by the relay. The partial decoding done at the relay may be described as decoding to a process-defined endpoint.

Further, while described in the context of LTE and WiMAX, it is within the scope of the exemplary embodiments of this invention to use the above described UE 10 and Node-B 12 procedures for other types of wireless communication systems that employ relays.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
an apparatus receiving from a source during a first time interval an encoded data block;
the apparatus receiving from the source during a second time interval additional error correction data for the encoded data block;
the apparatus receiving from a relay a modified version of the encoded data block that is partially decoded and not further re-encoded as compared to the encoded data block; and
the apparatus decoding the modified version of the encoded data block received from the relay using the additional error correction data received from the source.

2. The method of claim 1, wherein the modified version of the encoded data block comprises the encoded data block that is partially decoded to a process-defined end point, and wherein decoding the modified version of the encoded data block using the additional error correction data comprises decoding towards a results-defined end point.

3. The method of claim 2, wherein for the case where decoding the modified version of the encoded data block using the additional error correction data fails to reach the results-defined end point, the method further comprising decoding the encoded data block received from the source to the results-defined end point.

4. The method of claim 1, in which the apparatus comprises one of a base station and an access node, and wherein the modified version of the encoded data block is received in the second time interval.

5. The method of claim 1, wherein the additional error correction data comprises parity bits for the encoded data block received from the source.

6. The method of claim 1, wherein decoding the modified version of the encoded data block is with a code that differs from another code with which the encoded data block received from the source is encoded.

7. An apparatus, comprising:
at least one processor;
at least one memory including computer program code;
the at least one memory and the computer program code configured to, with the at least one processor, cause the apparatus at least to:
receive from a source during a first time interval an encoded data block;
receive from the source during a second time interval additional error correction data for the encoded data block;
receive from a relay a modified version of the encoded data block that is partially decoded and not further re-encoded as compared to the encoded data block; and
decode the modified version of the encoded data block received from the relay using the additional error correction data received from the source.

8. The apparatus of claim 7,
wherein the modified version of the encoded data block comprises the encoded data block that is partially decoded to a process-defined end point,
and wherein the apparatus is configured to decode the modified version of the encoded data block using the additional error correction data towards a results-defined end point.

9. The apparatus of claim 8, wherein for the case where the apparatus fails to reach the results-defined end point when decoding the modified version of the encoded data block using the additional error correction data, the at least one processor is further configured to cause the apparatus to decode to the results-defined end point the encoded data block that is received from the source.

10. The apparatus of claim 7, wherein the apparatus comprises one of a base station and an access node, and wherein the apparatus is configured to receive the modified version of the encoded data block in the second time interval.

11. The apparatus of claim 7, wherein the additional error correction data comprises parity bits for the encoded data block received from the source.

12. The apparatus of claim 7, wherein the apparatus is configured to decode the modified version of the encoded data block using a code that differs from another code with which is encoded the encoded data block that the apparatus received from the source.

13. A computer readable memory embodying a computer program that is executable by a processor to perform actions directed to distributed decoding, the actions comprising:
receiving from a source during a first time interval an encoded data block;
receiving from the source during a second time interval additional error correction data for the encoded data block;
receiving from a relay a modified version of the encoded data block that is partially decoded and not further re-encoded as compared to the encoded data block; and
decoding the modified version of the encoded data block received from the relay using the additional error correction data received from the source.

14. The computer readable memory of claim 13, wherein the modified version of the encoded data block comprises the encoded data block that is partially decoded to a process-defined end point, and wherein decoding the modified version of the encoded data block using the additional error correction data comprises decoding towards a results-defined end point, and wherein the additional error correction data comprises parity bits for the encoded data block received from the source.

15. The computer readable memory of claim 13, wherein for the case where decoding the modified version of the encoded data block using the additional error correction data fails to reach the results-defined end point, the actions further comprise decoding the encoded data block received from the source to the results-defined end point.

16. The computer readable memory of claim 13, wherein decoding the modified version of the encoded data block is with a code that differs from another code with which the encoded data block received from the source is encoded.

* * * * *